(12) United States Patent
Ladouceur et al.

(10) Patent No.: US 8,417,303 B2
(45) Date of Patent: Apr. 9, 2013

(54) MOBILE DEVICE CASE

(75) Inventors: Norman Miner Ladouceur, Waterloo (CA); Jason Tyler Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 297 days.

(21) Appl. No.: 12/833,178

(22) Filed: Jul. 9, 2010

(65) Prior Publication Data

US 2012/0008300 A1    Jan. 12, 2012

(51) Int. Cl.
*H04M 1/00* (2006.01)

(52) U.S. Cl.
USPC ........................................ 455/575.8

(58) Field of Classification Search .......... 361/807, 361/808, 809, 679.01, 679.55; 455/575.8
See application file for complete search history.

(56) References Cited

U.S. PATENT DOCUMENTS

| | | | |
|---|---|---|---|
| 4,823,397 A | 4/1989 | Hewitt | |
| 4,877,925 A | 10/1989 | Kobayashi | |
| 5,664,668 A | 9/1997 | Zainal et al. | |
| 5,716,730 A | 2/1998 | Deguchi | |
| 6,317,313 B1 | 11/2001 | Mosgrove et al. | |
| 6,492,605 B2 | 12/2002 | Iida | |
| 6,570,111 B2 | 5/2003 | Nakagawa et al. | |
| 6,984,793 B1 | 1/2006 | Chew | |
| 7,369,881 B2 * | 5/2008 | Tsujimoto | 455/575.1 |
| 7,449,650 B2 * | 11/2008 | Richardson et al. | 200/331 |
| D611,938 S | 3/2010 | Barbieri | |
| D628,568 S * | 12/2010 | Richardson et al. | D14/250 |
| D644,216 S * | 8/2011 | Richardson et al. | D14/250 |
| 2004/0240162 A1 * | 12/2004 | Hsu et al. | 361/680 |
| 2009/0080153 A1 * | 3/2009 | Richardson et al. | 361/679.56 |

FOREIGN PATENT DOCUMENTS

JP    2008 152147 A    7/2008

OTHER PUBLICATIONS

Extended European Search Report issued for corresponding EP Application No. 10168984.2 dated Jan. 13, 2011.

* cited by examiner

*Primary Examiner* — Lisa Lea Edmonds
*Assistant Examiner* — Xanthia C Cunningham
(74) *Attorney, Agent, or Firm* — Ridout and Maybee LLP

(57) ABSTRACT

A removable case for a mobile device is provided, the mobile device having a front face and a side edge, and an input button located on the side edge. The case includes a main body defining a region in which the mobile device can be removably received, and an actuator on the main body having a user interface and a button interface, wherein the actuator translates an input force received on the user interface into a button activating force applied by the button interface in a different direction than the input force.

20 Claims, 7 Drawing Sheets

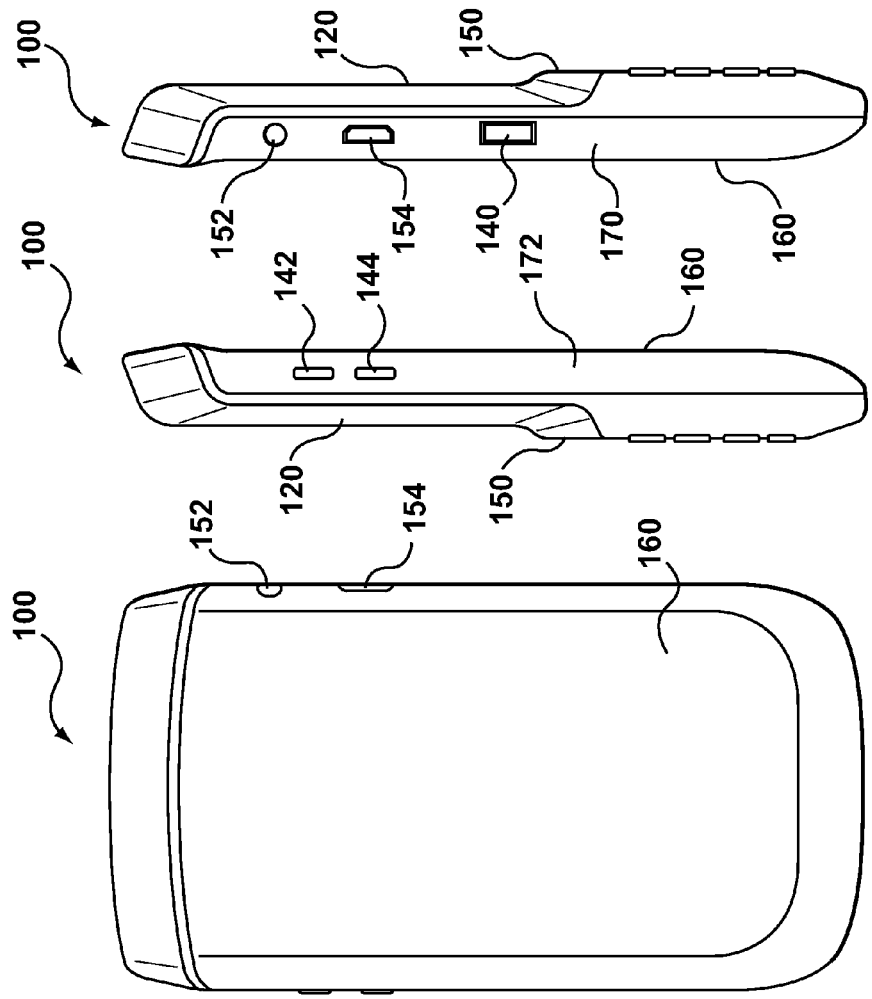
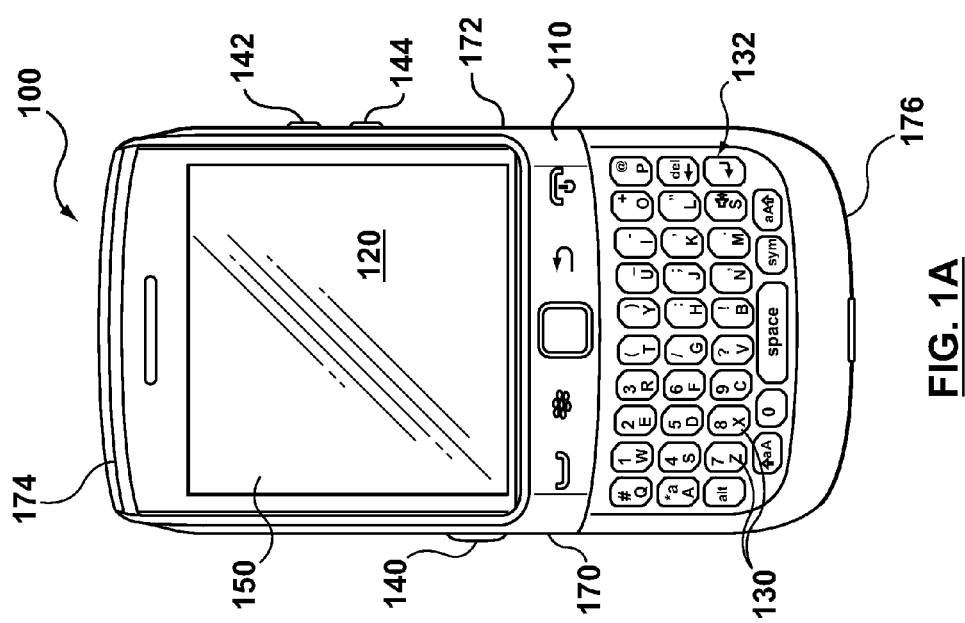

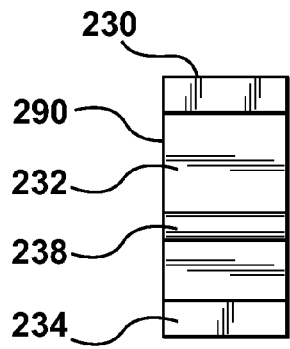
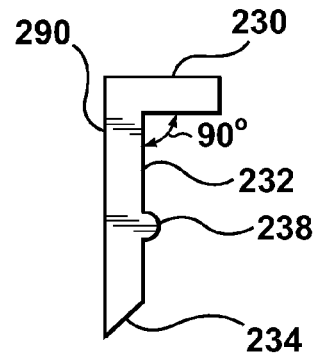
FIG. 8A    FIG. 8B
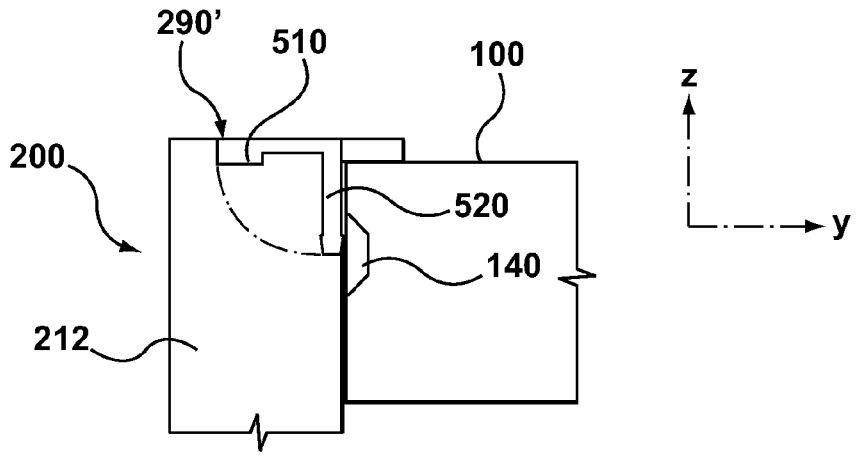
FIG. 9A
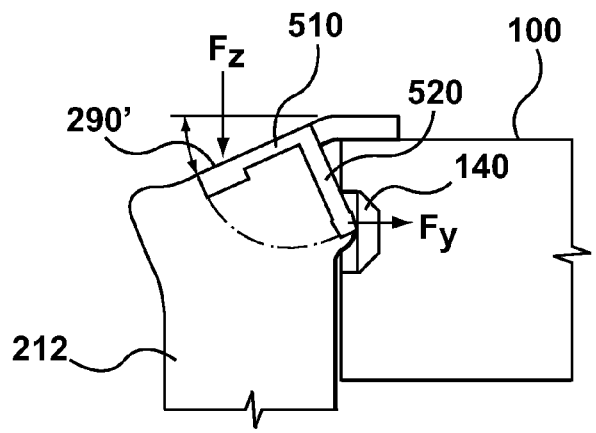
FIG. 9B

MOBILE DEVICE CASE

TECHNICAL FIELD

The present disclosure relates to cases for electronic mobile devices.

BACKGROUND

With their increasing power and functionality, mobile devices such as handheld electronic devices are being relied upon in an increasing number of applications and environments. In certain environments, it is desirable to use a mobile device without the user having to physically hold the device, such as when the mobile device is laying on a flat surface or in a cradle.

BRIEF DESCRIPTION OF THE DRAWINGS

Embodiments will now be described, by way of example only, with reference to the attached Figures, wherein:

FIG. 1A is a front view of an example of a mobile device to which examples of a mobile device case may be applied;

FIG. 1B is a back view of the mobile device of FIG. 1A;

FIG. 1C is a right side view of the mobile device of FIG. 1A;

FIG. 1D is a left side view of the mobile device of FIG. 1A;

FIG. 8A is a side view of an example of an actuator that can be integrated into the case of FIG. 2;

FIG. 8B is an end view of an example of the actuator of FIG. 8A;

FIG. 9A is a cross-sectional view of another example of a case with a mobile device as seen from line VI-VI in FIG. 5 when an actuator on the case is in its normal position; and FIG. 9B is the same view as 9A, but showing the actuator in an actuated position.

Like reference numerals are used throughout the Figures to denote similar elements and features.

DETAILED DESCRIPTION

Figure 2:
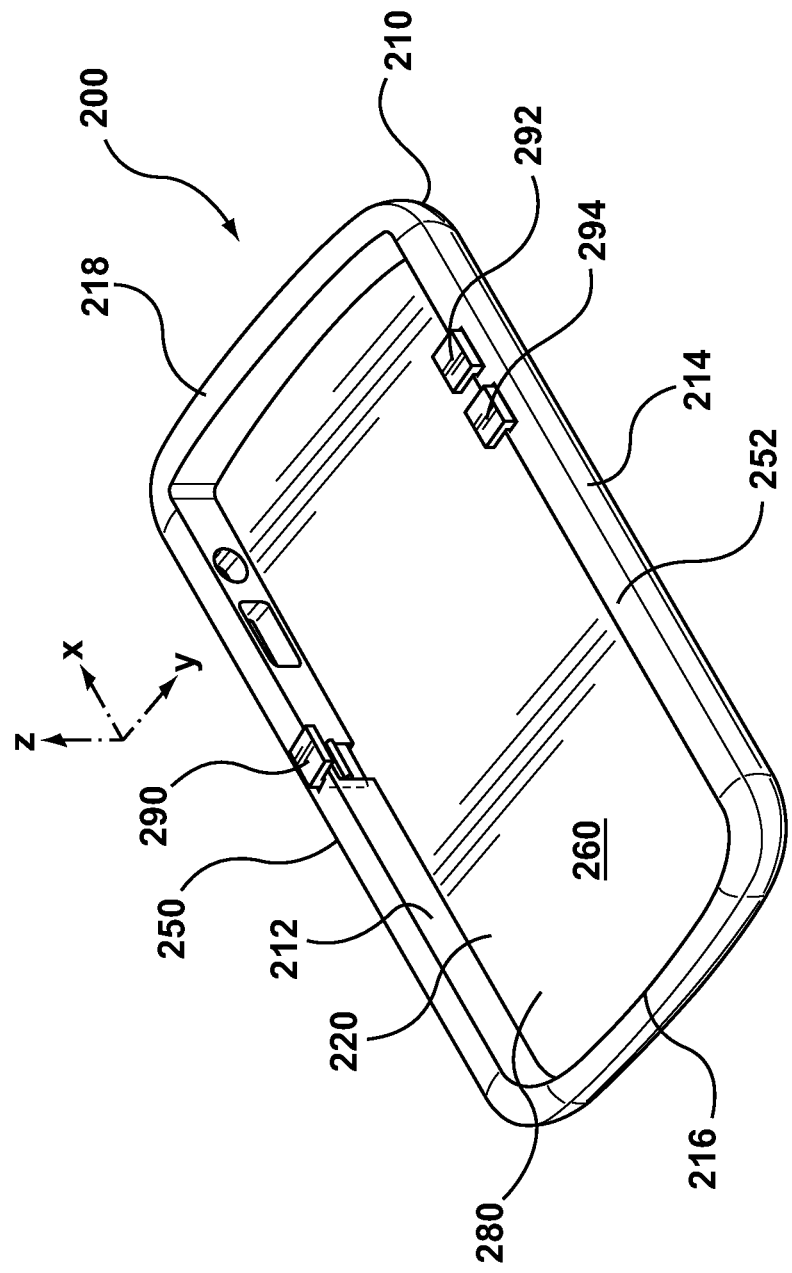
FIG. 2 is a perspective view of an example of a case for a mobile device such as the device of FIG. 1A.

According to one example is a removable case for a mobile device, the mobile device having a front face and a side edge, and an input button located on the side edge. The case includes a main body defining a region in which the mobile device can be removably received, and an actuator on the main body having a user interface and a button interface. The input button is activated by the actuator translating an input force received on the user interface into a button activating force applied by the button interface, the button activating force being applied in a different direction than the input force.

According to another example is a handheld unit that includes a handheld electronic mobile device and a removable case receiving the mobile handheld electronic device. The mobile device has a display screen on a front face of a housing thereof, the housing having opposite side edges that are substantially perpendicular to the front face, and a first input button on one of the side edges that is depressible towards an interior of the housing. The removable case includes a main body defining a region in which the mobile device is removably received with the display screen being viewable, and an actuator on the main body having a user interface and a button interface, wherein the actuator translates an input force that depresses the user interface in a direction towards the display screen into a button activating force applied by the button interface on the first input button, the activating force being substantially orthogonal to the input force.

As users carry their mobile devices with them throughout their daily activities, these devices are often dropped or scratched, and are subject to spilled liquids, dust, and general wear and tear. For protective or acetic purposes, users often cover their mobile devices, such as handheld electronic devices, with a case often referred to as a device case or skin. Generally, these cases are specifically designed to fit a specific device make and model. Mobile devices which commonly use cases include mobile smart phones, text and email messages devices, portable audio and video players, Global Positioning System (GPS) navigation devices, personal digital assistants (PDAs), electronic book readers, cameras, and portable video game players; however, these cases could be applied to any mobile device.

In accordance with one example is a case for a mobile device, the mobile device having a front face facing a Z-direction, and a side-edge that is substantially orthogonal to the front face, facing an X- or a Y-direction. An input button is located on the side edge of the mobile device, and the case includes a main body having a mobile device accommodating portion into which the mobile device is insertable. The case also includes an actuator that orthogonally translates force in the Z-direction to an X- or Y-direction for activating the input button.

Reference is made to FIGS. 1A-1D which show an example of a mobile device 100 to which examples of mobile device cases described herein can be applied. In FIGS. 1A-1D, the mobile device 100 is a handheld electronic device such as, for example, a mobile smart phone with a housing 110, a display screen 120, front buttons 130, and a plurality of side buttons 140, 142, 144. The housing 110 houses the electronic components of the mobile device 100 and has a front face 150, a back side 160, and left, right, top and bottom side edges 170, 172, 174 and 176, respectively. The front face 150 includes the display screen 120 and the front buttons 130 which may be arranged in the form of a keypad or keyboard 132. The front face 150 faces the Z-direction and is substantially parallel to back side 160. Users will typically view or access the device from an angle incident to the front face 150. The side button 140, as illustrated, is on the left side edge 170 which is substantially orthogonal to the front face 150. Side buttons 142, 144 are on a right side edge of the device housing 110 which is substantially orthogonal to the front face 150. In the illustrated embodiment the side button 140 is on a longitudinally extending left side edge of the housing, facing the Y-direction, and the side buttons 142, 144 are on a longitudinally extending right side edge of the housing 110, facing the opposite Y-oriented direction; however, the side buttons could be on any of the side edges including the top or bottom side edges in addition to left and right side edges and could face any direction substantially parallel to the X-Y plane and orthogonal to the front face 150.

The mobile device 100 could in various examples have many alternative numbers or arrangement of front buttons 130 and side buttons 140, 142, 144. These buttons are generally activated by a force applied by the user to push the button from its original position into the device housing 110. Activating a button results in an input to the mobile device 100 and may result in a visual, audible or tactile feedback response. Once the activating force is removed from a button, an elastic or other mechanical mechanism will force the button out of the housing and back to its original position.

Depending on the type of mobile device, the housing 110 may contain a number of internal components to control the functioning of the device and to respond to user input such as a button press. For example, in a mobile smart phone, the housing 110 may contain a controller comprising at least one processor (such as a microprocessor) which controls the overall operation of the device 100. The processor may interact with device subsystems such as a wireless communication subsystem for exchanging radio frequency signals with a wireless network to perform communication functions. The processor may interact with additional device subsystems including the display screen 120 such as a liquid crystal display (LCD) screen, input devices such as front buttons 130 and side buttons 140, 142, 144, flash memory, random access memory (RAM), read only memory (ROM), auxiliary input/output (I/O) subsystems, data ports, speakers, microphones, short-range communication subsystems, and other device subsystems.

In one example, the side button 140 is configured to activate a "voice input" function on the device 100 in which voice inputs are converted to text—for example a voice dialling function. In another example, side button 140 is configured as a "push-to-talk" key for device to device communications. In some examples, side buttons 142 and 144 are configured as volume control buttons for the device—for example activating upper side button 142 raises an output volume, and activating lower side button 144 lowers an output volume. Visual feedback, for example volume bars, may be provided on display screen 120 to indicate a relative volume setting when buttons 142 or 144 are activated. In some examples, the functionality provided by side buttons 140, 142 and 144 can be application specific.

The housing 110 could also include any number of external interfaces such as screens, video/audio ports 152, power ports, USB/data ports 154, camera lenses, camera flash, indicator lights, speakers, microphones, antennae, or air vents.

Figure 4:
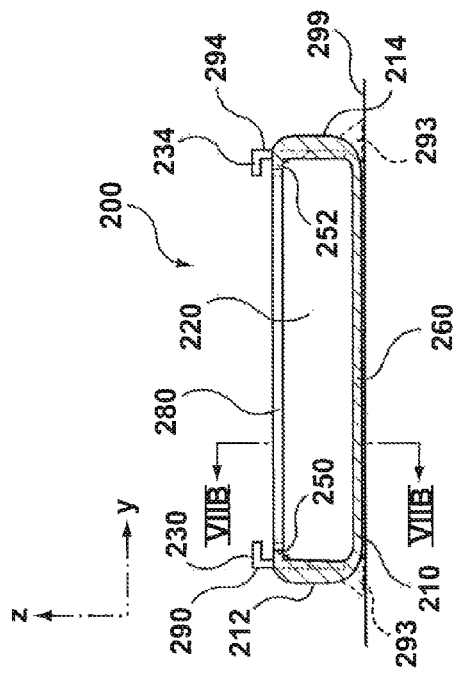
FIG. 4 is a sectional view of the case of FIGS. 2 and 3 resting on a support surface, the view of the case is taken along the lines IV-IV of FIG. 3.
Figure 3:
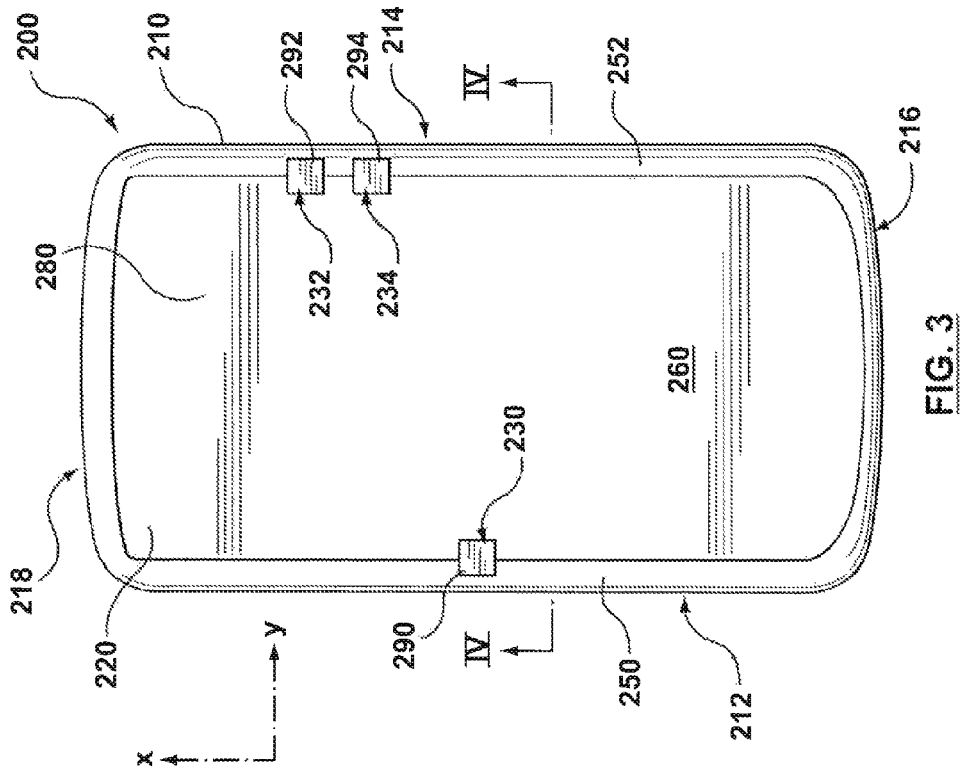
FIG. 3 is a front view of the case of FIG. 2.
Figure 5:
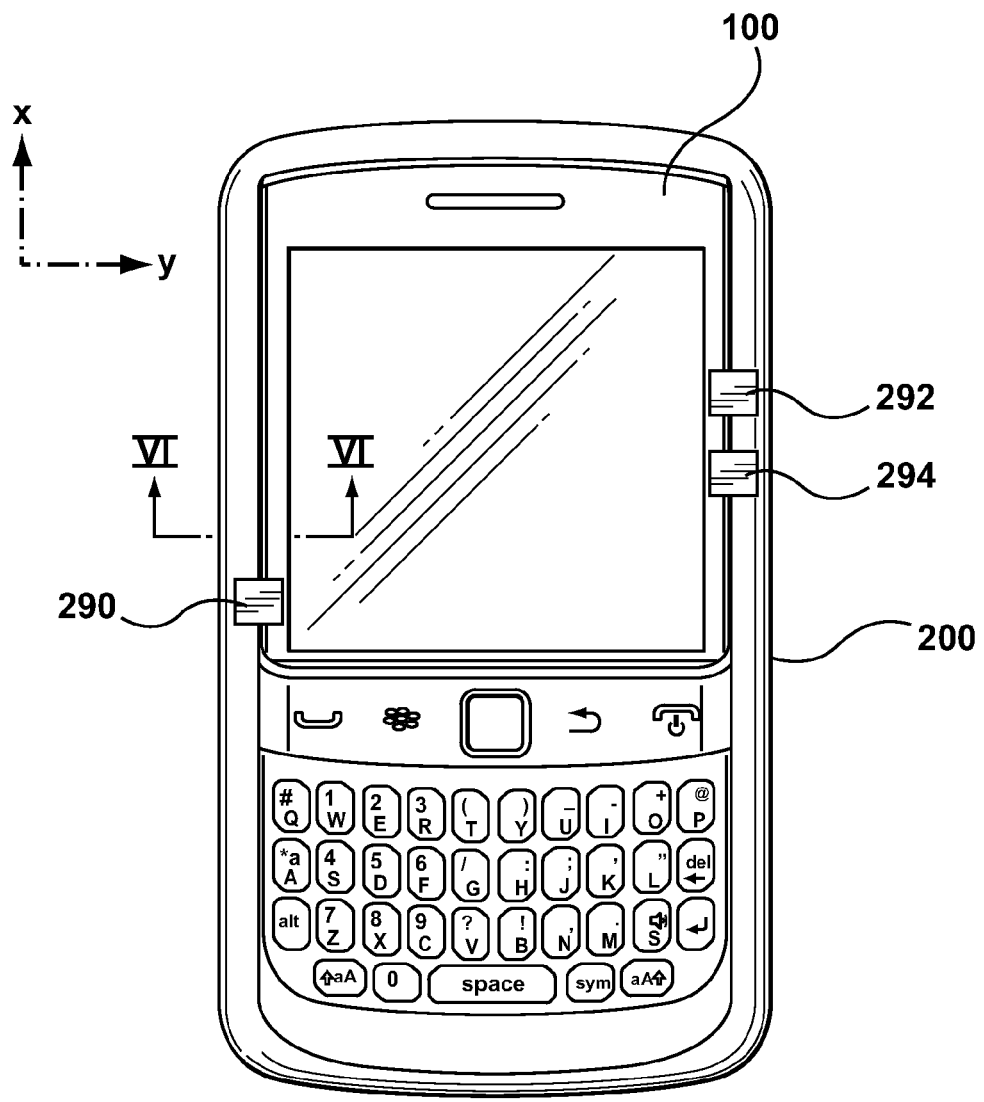
FIG. 5 is a front view of a mobile device inside the case of FIG. 2.

FIGS. 2, 3 and 4 illustrate an example of a removable mobile device case 200 which can be applied to the mobile device 100 in FIG. 1. FIG. 5 illustrates an example of a handheld unit that includes the mobile device case 200 mounted on mobile device 100. The mobile device case 200 has a main body 210 for accommodating the mobile device 100. The shape and size of the main body 210 is generally designed to fit a specific model of device. The main body 210 may for example be configured to cover substantial portions of the housing 110 of the mobile device 100 to protect it from dents, scratches and general wear and tear. In the illustrated example, the main body 210 of case 200 includes a planar base panel 260, a right side panel 214 extending forward from a longitudinal right peripheral edge of the base panel 260, a left side panel 212 extending forward from a longitudinal left peripheral edge of the base panel 260, a top side panel 218 and a bottom side panel 216. In some examples, inwardly projecting front flanges 250 and 252 that are substantially parallel to the base panel 260 may be provided on the forward edges of left side panel 212 and right side panel 214 respectively.

The base panel 260 and side panels 212, 214, 216 and 218 collectively define an internal cavity or region 220 for receiving the mobile device 100. In one example, the main body 210 is made as a single unit formed of a rigid material such as ABS plastic or other plastic, or metal, that can be temporarily deformed to fit the main body 210 onto the mobile device 100 such that the mobile device 100 is received within cavity 220 with the mobile device back side 160 facing the base panel 260, and the left and right side panels 212 and 214 gripping the opposite side edges 170, 172 of the mobile device 100. In some alternative examples, the main body 210 can be formed from less rigid materials such as silicon or rubber, or may be formed from combinations of rigid and flexible materials—for example, the main body may include an inner skin formed from silicon that is secured to an outer rigid body formed from plastic or metal.

In various examples, the case 200 may also come in a variety of colours or designs, and can even include decals or pictures to add a decorative or expressive element to the case 200.

In the illustrated example, the deformable main body 210 of the case 200 defines a front opening 280 to the region 220 to provide access to at least some of the user interfaces of the mobile device 100, and also to allow the mobile device 100 to be inserted into the case 200. For example, the opening 280 is configured to allow a user to view the display screen 120, and provide access to user inputs such as buttons 130 that are located in the keyboard 132 on the face of mobile device 100. In some embodiments, the case 200 may include a translucent or transparent window material over opening 280 which provides protection to the mobile device 100 while allowing the user to see and interact with interfaces such as the display screen 120. If the screen 120 is a touchscreen, the window material may be thin enough to allow the user activate the touchscreen through the window.

In some examples, external interfaces such as buttons may be covered by the case 200. To provide access to these buttons, the case may include visual aids or corresponding button extensions to indicate to the user the location of the underlying device buttons.

In some examples, the case may be designed to accommodate a device with moving parts such as a flip phone, slider phone, or camera lens. In some examples, the case could have a flap which may be folded over to protect the device's external interfaces such as a screen when the device is not in use. The flap can be opened when the user again wishes to access the external interfaces covered by the flap.

In an example, the case 200 includes actuators 290, 292 and 294 integrated with the main body 210 for respectively activating device side buttons 140, 142, 144. Referring to FIGS. 3 and 4, in the illustrated example, actuators 290, 292 and 294 extend forward from the main body 210 along the Z-axis and each have a respective forward facing physical user interface 230, 232, 234 that is substantially parallel with the front face 150 of the mobile device 100) for receiving a force in the Z-direction. When pressed, the actuators 290, 292 and 294 each orthogonally translate a force in the Z-direction (e.g. towards the front face 150 of the mobile device 100) to a perpendicular force in the X- or Y-direction (e.g. towards the side edges 172, 174) depending on the actuator's orientation on the perimeter of the case 200.

Referring to FIG. 5, when a device 100 is placed in the case 200, the actuator 290 is proximally aligned with side button 140, actuator 292 is proximally aligned with side button 142 and actuator 294 is proximally aligned with side button 144. While the Figures show only three actuators 290, 292, 294, the case 200 may have any number of integral buttons located around its perimeter of the front face 250 to correspond to device side buttons that are desired to be activatable from the Z-direction.

An example of actuator 290 will now be explained in greater detail with reference to FIGS. 6A, 6B, 7A, 7B, 8A and 8B. The actuator 290 includes a shaft 232 that has physical user interface 230 at one end thereof and a chamfered button interface 234 at an opposite end thereof. In one example, the physical user interface 230 takes the form of an enlarged head portion providing a pushable key surface. The user interface 230 is fixed at a substantially right angle (see for example FIG. 8B) to a forwardly extending end of the shaft 232. In an example, physical user interface 230 is large enough that it can be pressed by a user who has reduced physical capabilities but small enough so as to not impede viewing of the device display screen. As seen in FIGS. 7A and 7B, in one example, the actuator shaft 232 passes through and is slidable within a slot 236 that is provided in an upper portion of the side panel 212, with the chamfered button interface 234 being received within a recess 242 that is provided in the side panel 212. A protrusion 238 can be provided on the shaft 232 to limit the movement of the actuator 290 along the Z-axis away from the front face 150 of the mobile device 100.

Figure 6A:
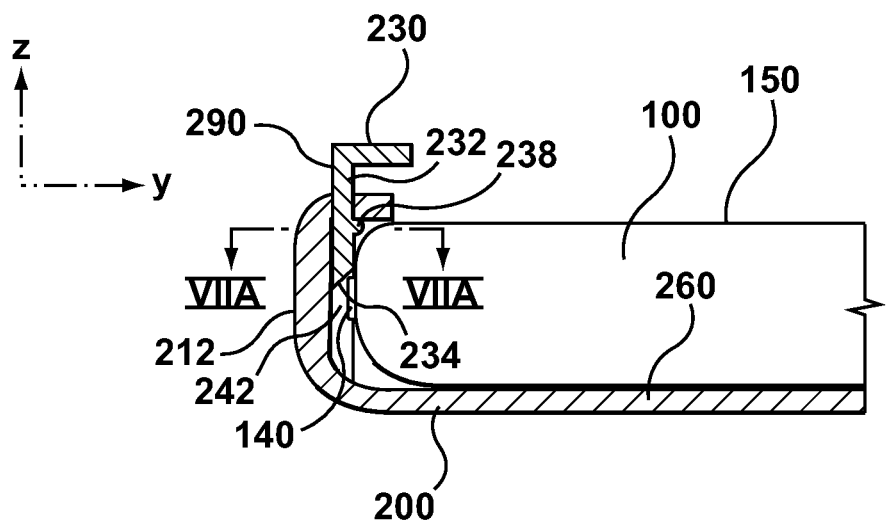
FIG. 6A is a cross-sectional view of part of the case taken across lines VI-VI in FIG. 5 when an actuator on the case is in a normal position, according to one example.
Figure 6B:
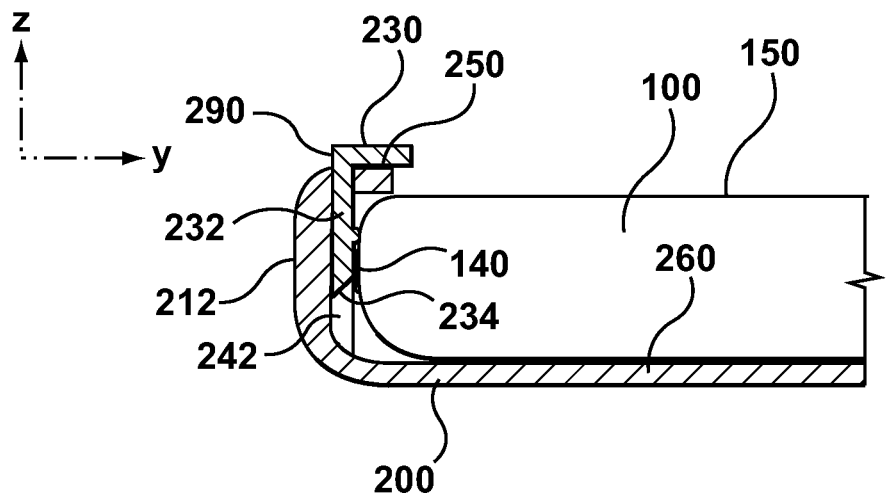
FIG. 6B is same view as 6A, but showing the actuator is in an actuated position.
Figure 7A:
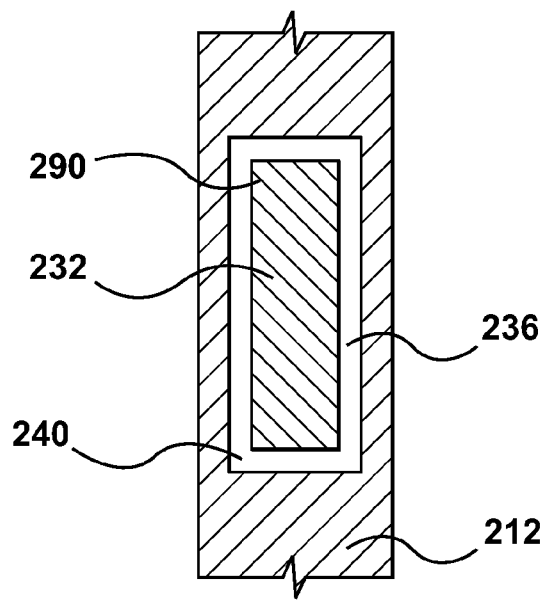
FIG. 7A is a partial sectional view showing part of the case taken across lines VIIA-VIIA of FIG. 6A.
Figure 7B:
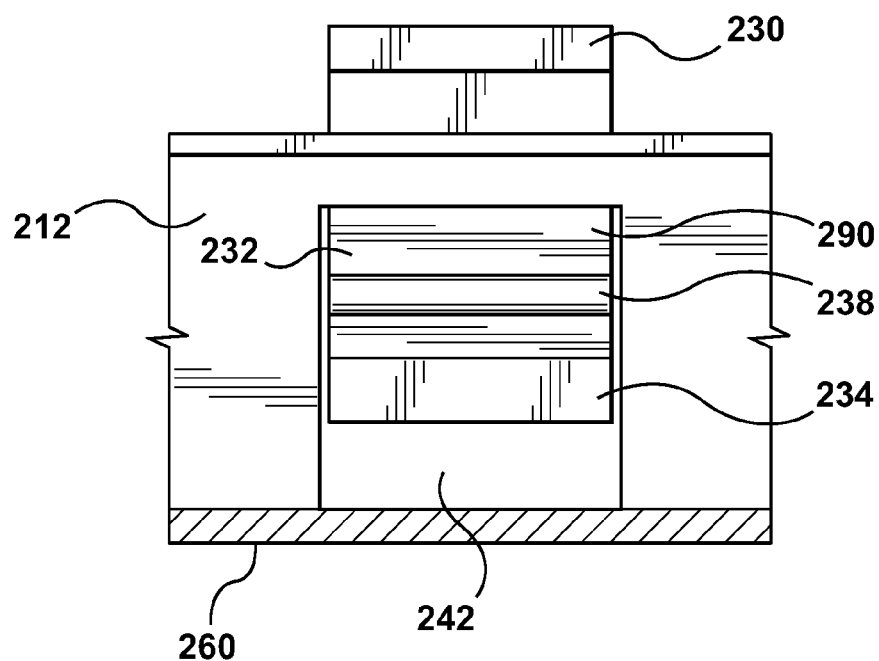
FIG. 7B is a partial sectional view showing part of the case taken across lines VIIB-VIIB of FIG. 4.

Referring to FIGS. 6A and 6B, operation of the actuator 290 according to an example will now be described. In FIGS. 6A and 6B, the mobile device 200 may for example be lying on a horizontal flat surface such as a table or desk top, or mounted in a cradle. FIG. 6A shows the actuator 290 in a first or normal resting position in which the chamfered button interface 234 is positioned to contact a forward edge of button 140, and the physical user interface 230 is spaced apart from the front surface 150 of the mobile device 100. In FIG. 6B, the actuator 290 has been depressed into an activated position by a force applied on the physical user interface 230 in the Z direction. The Z-direction force is orthogonally translated at the chamfered button interface 234 into a Y-direction force that displaces the device side button 140 in the Y direction towards an interior of the mobile device 100. In one example, the physical user interface 230 comes into contact with the front flange 250 of the case body when the actuator 290 is in its activated position as shown in FIG. 6B, limiting further depression of the actuator 290. The actuator 290 will remain in the position shown in FIG. 6B until pressure is removed from the physical user interface 230, after which the actuator 290 and side button 140 move back to their normal resting position as shown in FIG. 6A. In one example, the force of side button 140 pushing on chamfered button interface 234 provides force for moving the actuator 290 from its activated position shown in FIG. 6B back to its normal resting position shown in FIG. 6A, and biasing the actuator into its normal resting position until an external activating force is applied to it.

In some examples, a resilient deformable portion of the resilient side panel 212 near the actuator 290 is deformed from a normal position as the actuator 290 is moved into the actuated position. When the activating pressure is subsequently removed from actuator 290, the resilient deformable portion of side panel 212 moves back to its normal position under elastic forces thereby providing force for moving the actuator 290 from its activated position shown in FIG. 6B back to its normal resting position shown in FIG. 6A. Accordingly, in some examples, the side panel 212 biases the actuator 290 into its normal resting position until an external activating force is applied to it. The protrusion 238 limits the outward movement of the actuator 290 once it has reached its normal outer position. In some examples, portions of the side panel 212 may be thicker or reinforced in the vicinity of the actuator 290 to provide rigidity to support the side panel 212 as the actuator 290 is pressed.

In the illustrated example, actuators 292 and 294 are substantially identical in configuration and operation to actuator 290.

Accordingly, actuators 290, 292 and 294 allow a user to press towards the front face of the device 100 to activate side buttons on the device 100. Among other things, such a feature may be useful for users who need to lie the device 100 down on a flat surface or secure the device in a cradle to use the device, including users who have physical limitations that would inhibit conventional hand held use of the device 100.

To prevent the device from slipping when the user presses an actuator 290, 292, 294 the base panel 260 of the device may be composed of a non-slip material which will create a resistance to sliding along a smooth surface. The non-slip material may also make the device easier or more comfortable to hold.

In some examples, the base panel 260 of the case 200 may be designed to prevent the device from tipping when it is laid on a flat surface. Mobile devices are often designed with bevelled or curved edges which may increase the aesthetic appeal of the device. However, these edges may allow the device to tip when a force in the Z-direction is applied near the edge of the device. In some embodiments, the base panel 260 of the case 200 may be designed to sit flush with a flat surface to reduce the chance of tipping.

In some examples, the base panel 260 of the case 200 may extend in the X- or Y-direction away from the edge of the device. For example, outwardly extending flanges 293 (shown in dashed lines on FIG. 4) may be integrally formed around peripheral edges of the base panel 260 to engage the support surface 299 on which the mobile device 100 rests and provide stabilization to prevent the mobile device 100 from tipping over as the actuators 290, 292, 294 are pressed.

Another example of an actuator configuration is shown in FIGS. 9A and 9B in which the integral actuator 290' has a receiving physical user interface 510 and a button interface 520 connected at substantially right angles to each other and secured to the side panel 212. The user interface 510 and button interface 520 are coupled such that when a force in the Z-direction Fz is applied to the user interface 510, the actuator 290' rotates causing the button interface 520 to exert a force in the Y-direction on the side button 140. FIG. 9A illustrates this embodiment with the actuator 290' in its normal resting position. In FIG. 9B, the user is exerting a force in the Z-direction Fz on the user interface 510 causing a rotation of the actuator 290' which in turn creates a force in the orthogonal or Y-direction Fy on the side button 140. In one example, once the external force Fz is removed, the actuator 290' is returned from the activated position of FIG. 9B to its normal resting position seen in FIG. 5A, by the movement of the elastically deformable material of side panel 212 back to its original shape, or backpressure from the side button 140, or a combination of both.

In some examples, the case 200 may include a spring that is compressed when the actuator is actuated and which subsequently provides a force to return the actuator to its original resting position.

In some embodiments, the actuators 290, 290', 292, 294 will not limit the ability of the user to apply a force in the X- or Y-direction to directly activate the side buttons without translating the direction of the force.

In the embodiments and drawings described above, the sides and front face of the mobile device have been illustrated as being somewhat orthogonal, however, it would be understood by a person skilled in the art that depending on the design of the mobile device, the embodiments of the current disclosure can be designed to translate a force from any direction to any other direction to activate a button on the device, and is not limited to the situation where the two directions are orthogonal.

At least some examples described herein relate to a removable case 200 for use with a mobile device 100 that has a front face 150 and a side edge 170, and an input button 140 located on the side edge. In at least some examples, the removable case 200 includes a main body 210 defining a region 260 in which the mobile device 100 can be removably received. An actuator 290 on the main body 210 has a user interface 230 and a button interface 234. The input button 140 is activated by the actuator 290 translating an input force received on the user interface 230 into a button activating force applied by the button interface 234 (for example a Z-direction force), the button activating force being applied in a different direction (for example a Y-direction) than the input force. Accordingly, as noted above, in some examples actuators 290, 292 and 294 allow a user to press towards the front face of the device 100 to activate side buttons on the device 100. Among other things, such a feature may be useful for activating side buttons on a device 100 that is lying face up on a flat surface flat surface or secured in a cradle, and could be useful to users who have physical limitations that would inhibit conventional hand held use of the device 100.

The above-described embodiments of the present application are intended to be examples only. Alterations, modifications and variations may be effected to the particular embodiments by those skilled in the art without departing from the scope of the application, which is defined by the claims appended hereto.

The invention claimed is:

1. A removable case for a mobile device, the mobile device having a front face and a side edge, and an input button located on the side edge, the case comprising:
a main body defining a region in which the mobile device can be removably received; and
an actuator on the main body and having a user interface and a button interface;
wherein the input button is activated by the actuator translating an input force received on the user interface into a button activating force applied by the button interface, the button activating force being applied in a different direction than the input force.

2. The case of claim 1 wherein the main body includes a base panel and opposed first and second side panels provided along opposite edges of the base panel and configured for gripping opposite side edges of the mobile device when the mobile device is received with the region, the actuator being located on the first side panel.

3. The case of claim 2 wherein the opposed side panels are temporarily deformable to receive the mobile device within the region.

4. The case of claim 2 wherein the actuator moves from a first position to an activated position when the input force is received and moves from the activated position back to the first position when the input force is removed.

5. The case of claim 4 wherein at least a portion of the first side panel is formed from resilient material that is temporarily deformed when the actuator moves from the first position to the activated position and which returns to an original shape when the actuator moves from the activated position to the first position.

6. The case of claim 5 wherein the first side panel biases the actuator into the first position.

7. The case of claim 4 wherein the button activating force is substantially orthogonal to the input force.

8. The case of claim 7 wherein the actuator includes a shaft having the user interface at a first end thereof and the button interface at an opposite end thereof, the shaft being slidably mounted to the first side panel, the user interface comprising an enlarged head portion and the button interface comprising a chamfered surface for contacting the input button with increasing force as the actuator is moved from the first position to the activated position.

9. The case of claim 4 wherein the user interface and the button interface are connected at substantially right angles to each other and the actuator is pivotally mounted to the side wall such that when the input force is applied to the user interface the button interface pivots to apply the button activating force.

10. The case of claim 9 wherein the first side panel wall comprises a resilient deformable portion in contact with the actuator that is deformed when the actuator moves to the activated position and which biases the actuator into the first position.

11. The case of claim 4 comprising a further actuator on the first side panel or the second side panel, the further actuator having a user interface and a button interface; wherein the further actuator activates a further input button located on a side edge of the mobile device by translating an input force received on the user interface into a button activating force applied by the button interface in a different direction than the input force.

12. The case of claim 2, wherein the base panel comprises a non-slip material to resist slipping between the base panel and a support surface that the case rests on when the input force is applied to the user interface.

13. The case of claim 2, wherein the base panel includes a flange extending from a peripheral edge thereof for contacting a support surface to prevent the mobile device from tipping when the input is applied to the user interface.

14. A handheld unit comprising:
a handheld electronic mobile device having a display screen on a front face of a housing thereof, the housing having opposite side edges that are substantially perpendicular to the front face, and a first input button on one of the side edges that is depressible towards an interior of the housing; and
a removable case for receiving the mobile handheld electronic device, the case comprising:
a main body defining a region in which the mobile device is removably received with the display screen being viewable; and
an actuator on the main body having a user interface and a button interface;
wherein the actuator translates an input force that depresses the user interface in a direction towards the display screen into a button activating force applied by the button interface on the first input button, the activating force being substantially orthogonal to the input force.

15. The handheld unit of claim 14 wherein the main body includes a base panel, and opposed first and second side panels extending along opposite edges of the base panel and configured for gripping the opposite side edges of the mobile device, the actuator being located on one of the side panels and in alignment with the first input button.

16. The handheld unit of claim 15 wherein the actuator moves from a first position to an activated position when the input force is received and moves from the activated position back to the first position when the input force is removed, one or both of the first input button and the side panel on which the actuator is located providing a return force biasing the actuator into the first position.

17. The handheld unit of claim 16 wherein at least a portion of the side panel on which the actuator is located is temporarily deformed from an original position when the actuator moves to the activated position, and movement of the side panel on which the actuator is located back to the original position biases the actuator into the first position.

18. The handheld unit of claim 14 wherein the first input button activates a push to talk function of the mobile device.

19. The handheld unit of claim 14 wherein the mobile device comprises a second input button on one of the side edges that is depressible towards an interior of the housing, and the case comprises a second actuator on the main body having a user interface and a button interface, wherein the second actuator translates an input force that depresses the user interface in a direction towards the display screen into a button activating force applied by the button interface on the second input button, the activating force being substantially orthogonal to the input force, and wherein activating the first input button causes an audio output volume of the mobile device to increase and activating the second input button causes the audio output volume to decrease.

20. The handheld unit of claim 14 wherein the main body includes ABS plastic.

\* \* \* \* \*